US006752283B2

(12) United States Patent
Kiviniitty

(10) Patent No.: US 6,752,283 B2
(45) Date of Patent: Jun. 22, 2004

(54) ROPE HOIST PROVIDED WITH TRAVERSING MACHINERY

(75) Inventor: Ari Kiviniitty, Hämeenlinna (FI)

(73) Assignee: KCI Konecranes Plc., Hyvinkaa (FI)

( * ) Notice: Subject to any disclaimer, the term of this patent is extended or adjusted under 35 U.S.C. 154(b) by 0 days.

(21) Appl. No.: 10/137,279

(22) Filed: May 3, 2002

(65) Prior Publication Data

US 2002/0170872 A1 Nov. 21, 2002

Related U.S. Application Data

(63) Continuation of application No. PCT/FI00/01129, filed on Dec. 21, 2000.

(30) Foreign Application Priority Data

Dec. 21, 1999 (FI) .............................................. 19992750

(51) Int. Cl.[7] ................................................ B60C 19/00
(52) U.S. Cl. ........................................ 212/331; 212/274
(58) Field of Search .......................... 212/274, 71, 328, 212/330, 331

(56) References Cited

U.S. PATENT DOCUMENTS 2,514,494 A 7/1950 Holdeman
3,750,591 A * 8/1973 Makinster et al. .......... 104/112
4,238,038 A * 12/1980 Fikse et al. .................... 212/89

FOREIGN PATENT DOCUMENTS

DE 2012771 12/1970
EP 0 082 046 6/1983

* cited by examiner

*Primary Examiner*—Thomas J. Brahan
(74) *Attorney, Agent, or Firm*—Birch, Stewart, Kolasch & Birch, LLP

(57) ABSTRACT

A rope hoist provided with traversing machinery, the rope hoist comprising a trolley (2), and in connection therewith a lifting gear (3), a lifting rope (4), rope pulleys (5) and traversing machinery (7) for moving the trolley (2). The traversing machinery (7) allows to move the trolley (2) along a girder (11), for example. Rope pulleys (5) are used to reduce the strength of the rope. A part of the traversing machinery (7) is arranged inside at least one rope pulley (5) in such a manner that at least one shaft in the traversing machinery (7) remains at least partly inside the rope pulley (5).

6 Claims, 1 Drawing Sheet

ROPE HOIST PROVIDED WITH TRAVERSING MACHINERY

Figure 1:
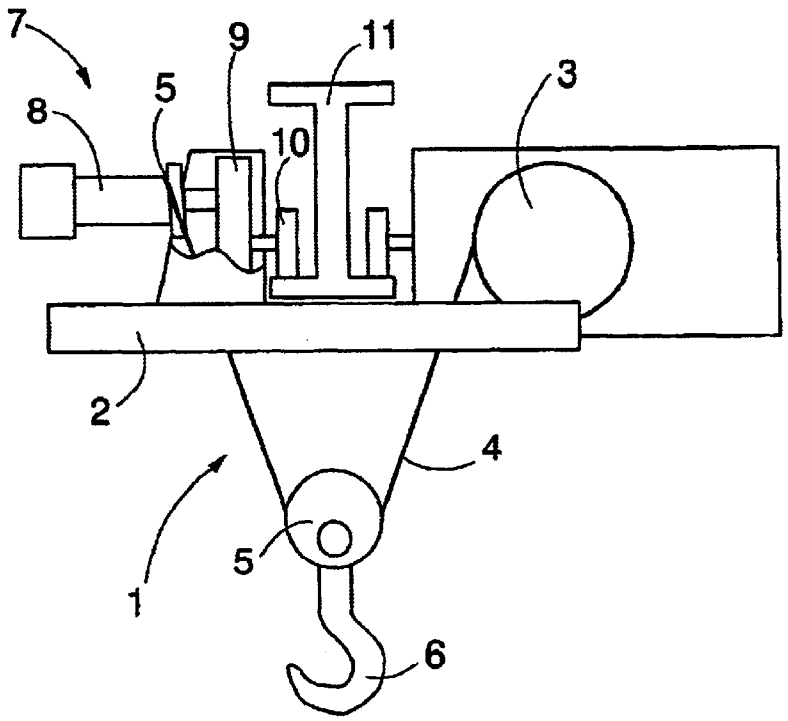

This application is a Continuation of International Application PCT/FI00/01129 filed on Dec. 21, 2000, which designated the U.S. and was published under PCT Article 21(2) in English.

The invention relates to a rope hoist provided with traversing machinery, the rope hoist comprising a trolley, and in connection therewith a lifting gear, a lifting rope, rope pulleys and traversing machinery, whereby the trolley can be moved using the traversing machinery.

The rope hoist provided with traversing machinery comprises a trolley, and in connection therewith a lifting gear, a lifting rope, rope pulleys and traversing machinery for moving the trolley. The trolley is shifted by means of the traversing machinery along a track, for example a girder. Rope pulleys are used to reduce the strength of the rope. A rope pulley is typically placed in connection with the traversing machinery, for example using different suspension portions supported to the frame of the trolley. The traversing machinery and the rope pulley are then typically placed on top of each other in the direction of the lifting height of the rope hoist. In such a case it can sometimes be difficult to increase the available lifting height sufficiently. In addition, the suspension arrangements for supporting the rope pulley are complex and difficult and therefore expensive and liable to malfunction.

It is an object of this invention to provide a simple and reliable rope hoist provided with traversing machinery.

The rope hoist of the invention is characterized in that at least a part of the traversing machinery is arranged inside at least one rope pulley in such a manner that at least one shaft in the traversing machinery remains at least partly inside the rope pulley.

The basic idea of the invention is that in the rope hoist provided with at least traversing machinery, a part of the traversing machinery is arranged inside at least one rope pulley so that at least one shaft in the traversing machinery remains at least partly inside the rope pulley. The idea of a first preferred embodiment is that a part of the rope pulley forms a flange in the traversing machinery motor or a part thereof. A second preferred embodiment provides the idea that a part of the rope pulley constitutes a part of the frame of the gear in the traversing machinery. A third preferred embodiment presents such an idea that the rope pulley is articulated in connection with the traversing machinery in such a manner that the angle between the centre of the rope pulley and the longitudinal axis of the motor may change when the direction of the incoming rope changes.

The invention provides such an advantage that the solution of the invention allows to implement a very simple hoist trolley structure in the rope hoist which fits into a very small space. This solution is also very reliable, as the rope pulley does not require specific separate support and frame structures. It is also possible to maximize the lifting height of the lifting gear, as the traversing machinery and rope pulley are not placed one upon the other.

Figure 2:
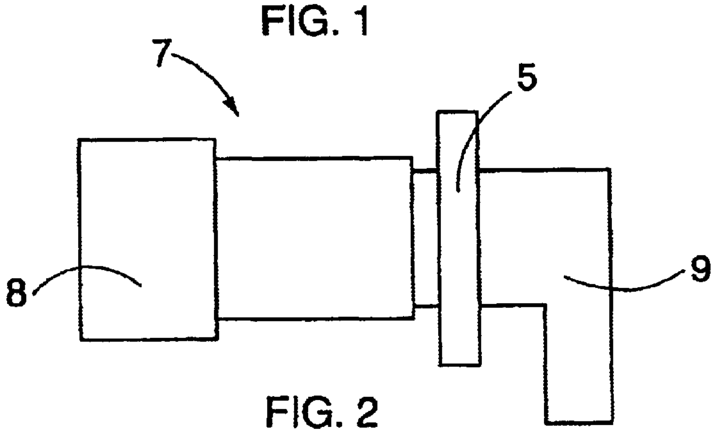
Figure 3:
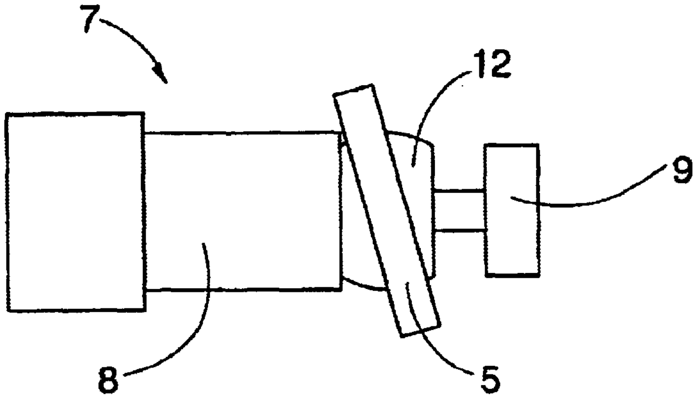

The invention will be described in more detail in the appended drawings, in which FIG. 1 is a partly cut-open side view schematically showing a rope hoist of the invention, FIG. 2 is a side view schematically showing a detail of a second rope hoist of the invention, and FIG. 3 is a side view showing a detail of a third rope hoist of the invention.

FIG. 1 shows a rope hoist 1 comprising a trolley 2 with a lifting gear 3 attached to the frame of the trolley. The lifting gear 3 drives a lifting rope 4. Rope pulleys 5 are arranged in connection with the lifting rope 4 to reduce the strength of the rope. For example a lifting hook 6, which can be used to attach the unit to be lifted to the rope hoist 1, can be arranged at the lower rope pulley 5. The rope hoist 1 further comprises traversing machinery 7 attached to the frame of the trolley 2. The traversing machinery 7 comprises a traverse motor 8 and possibly also a gear 9 functioning as a reduction gear. The traversing machinery 7 employs travel wheels 10 attached to the frame of the trolley 2, whereby the rope hoist 1 can be moved along a track, such as a girder 11, by means of the traversing machinery 7.

A rope pulley 5 is arranged in connection with the traversing machinery 7 in such a manner that a part of the traversing machinery 7 is placed inside the rope pulley 5 so that at least one of the shafts in the traversing machinery 7 remains inside the rope pulley 5. In the embodiment shown in FIG. 1, the shaft of the traverse motor 8 is arranged through the rope pulley 5. The end flange of the traverse motor 8 forms the frame of the rope pulley 5. The end flange of the traverse motor 8 may also form a bearing race of the rope pulley 5. The rope pulley 5 is fixedly attached into an inclined position in relation to the traverse motor 8 so that the longitudinal axis of the traverse motor 8 and the centre axis of the rope pulley 5 are substantially at a different angle. Then the rope pulley 5 is substantially parallel with the lifting rope 4 in the most typical range of use of the rope hoist. Typically the angle of departure of the lifting rope 4 from the rope pulley 5 may range between ±4°. Thus by arranging the longitudinal axis of the traverse motor 8 and the centre axis of the rope pulley 5 at an 4° angle regarding one another, the inclination of the lifting rope 4 may range between 0° to 8° regarding the vertical direction. When the lifting hook 6 is in its lowest position, the lifting rope 4 may be in a substantially vertical position and when the lifting hook 6 is in its highest position, the angle of the lifting rope 4 may deviate from the vertical direction by 8°. The extent of the variations in the angle of departure of the lifting rope 4 depends on the distance between the starting points at the upper end of the lifting rope 4 and also on the lifting height.

FIG. 2 shows traversing machinery 7 in which the rope pulley 5 is arranged around the gear 9. In this case a part of the gear 9 frame may form the body of the rope pulley 5 or a part thereof. A portion of the gear 9 is placed outside the rope pulley 5. However, the gear 9 comprises several shafts and at least one of the shafts in the gear 9 is at least partly inside the rope pulley 5.

FIG. 3 shows a solution in which the rope pulley 5 is arranged around the flange of the traverse motor 8 in the traversing machinery 7 by means of a joint 12. The joint 12 allows the rope pulley 5 to be articulated regarding the traverse motor 8 so that the angle between centre of the rope pulley 5 and the longitudinal axis of the traverse motor 8 may change as the incoming direction of the lifting rope 4 changes.

The drawing and the description associated thereto are merely intended to illustrate the idea of the invention. The details of the invention may vary within the scope of the claims. Therefore the structure of the rope pulley 5 may vary as desired. If a part of the rope pulley 5 forms a portion of the traverse motor 8 flange or the gear 9 frame, said parts are then preferably formed into the same casting.

What is claimed is:

1. A rope hoist comprising a trolley, and in connection therewith a lifting gear, a lifting rope, and rope pulleys for lifting a load and traversing machinery separate from said lifting gear, whereby the trolley is moved using the traversing machinery, and at least a part of the traversing machinery is arranged inside at least one of said rope pulleys in such a manner that at least one shaft in the traversing machinery remains at least partly inside the at least one rope pulley.

2. A rope hoist as claimed in claim 1, wherein the traversing machinery comprises a traverse motor including a traverse motor flange and a portion of the at least one rope pulley forms at least a part of the traverse motor flange.

3. A rope hoist as claimed in claim 1, wherein the traversing machinery comprises a traverse motor and a gear body and the at least one rope pulley constitutes a part of the gear body.

4. A rope hoist as claimed in claim 1, wherein the at least one rope pulley is arranged into an inclined position regarding the traversing machinery.

5. A rope hoist as claimed in claim 4, wherein the at least one rope pulley is arranged at an approximately 4° angle regarding the traversing machinery.

6. A rope hoist as claimed in claim 1 wherein the traversing machinery comprises a joint, whereby the at least one rope pulley is arranged in connection with the traversing machinery by means of the joint so that the angle between the traversing machinery and the at least one rope pulley may change.

* * * * *